(12) United States Patent
Kumar et al.

(10) Patent No.: US 9,237,099 B2
(45) Date of Patent: Jan. 12, 2016

(54) EMULATING CIRCUIT SWITCHING IN ETHERNET USING AN ETHERNET CIRCUIT HEADER

(71) Applicant: BROADCOM CORPORATION, Irvine, CA (US)

(72) Inventors: Vivek Kumar, Bangalore (IN); Santhoshkumar Chandrasekar, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 167 days.

(21) Appl. No.: 14/059,341

(22) Filed: Oct. 21, 2013

(65) Prior Publication Data

US 2015/0092770 A1    Apr. 2, 2015

Related U.S. Application Data

(60) Provisional application No. 61/885,376, filed on Oct. 1, 2013.

(51) Int. Cl.
*H04L 12/741*    (2013.01)
*H04L 12/46*     (2006.01)
*H04L 12/723*    (2013.01)

(52) U.S. Cl.
CPC .......... *H04L 45/745* (2013.01); *H04L 12/4641* (2013.01); *H04L 45/50* (2013.01)

(58) Field of Classification Search
CPC .............. H04L 2012/5617; H04L 2012/5621; H04L 2012/5624; H04W 45/50
See application file for complete search history.

(56) References Cited

U.S. PATENT DOCUMENTS

| | | | |
|---|---|---|---|
| 2003/0067928 A1* | 4/2003 | Gonda | 370/401 |
| 2008/0198857 A1* | 8/2008 | Kim et al. | 370/401 |
| 2009/0141629 A1* | 6/2009 | Gerosa et al. | 370/235 |
| 2011/0261812 A1* | 10/2011 | Kini et al. | 370/389 |
| 2013/0287027 A1* | 10/2013 | Ra et al. | 370/392 |
| 2013/0343528 A1* | 12/2013 | Polland et al. | 379/93.06 |

* cited by examiner

*Primary Examiner* — Pao Sinkantarakorn
*Assistant Examiner* — Stephen Steiner
(74) *Attorney, Agent, or Firm* — McDermott Will & Emery LLP

(57) ABSTRACT

A device for emulating circuit switching in Ethernet using an Ethernet circuit header (ECH) includes a node of a network that is configured to receive a packet. A control module may be configured to determine that a destination address portion of a data frame associated with the packet matches a predefined format. A parser module may be configured to parse an ECH portion of the destination address to identify a circuit-identification (ID). A look-up module may be configured to look up the circuit ID in a circuit-ID table using at least one of a plurality of key options to generate a look-up-result data. The control module may be configured to use the look-up-result data to direct the packet to a destination interface of a destination node.

20 Claims, 5 Drawing Sheets

EMULATING CIRCUIT SWITCHING IN ETHERNET USING AN ETHERNET CIRCUIT HEADER

CROSS-REFERENCE TO RELATED APPLICATIONS

This application claims the benefit of priority under 35 U.S.C. §119 from U.S. Provisional Patent Application 61/885,376 filed Oct. 1, 2013, which is incorporated herein by reference in its entirety.

TECHNICAL FIELD

The present description relates generally to communications, and more particularly, but not exclusively, to emulating circuit switching in Ethernet using an Ethernet circuit header (ECH).

BACKGROUND

Ethernet is based on packet switch technology, which involves communication of packets between various nodes (e.g., switches) of a network (e.g., a local area network (LAN)). The packets may be data packets or control packets, and different packets from a single endpoint may follow different paths in the network. It is possible to broadcast, on the underlying data-link layer in Ethernet networks, by addressing frames that are intended to reach every endpoint of a given LAN segment to a predefined media-access control (MAC) address (e.g., set to FF:FF:FF:FF:FF:FF) defined by the Internet Assigned Number Authority (IANA). The Ethernet broadcast nature may serve well in many applications where the topology changes are very dynamic such as core, enterprises, etc., but in some applications the change in topology may not be so dynamic, for example, mobile backhaul, or long distance transport between two continents, or a big fabric switch in a data center, where the path between many endpoints can be static.

Ethernet can have unicast and multicast addresses, where unicast MAC addresses are randomly distributed and are assigned to all ports of every device by the device manufacturer. The Ethernet multicast address is defined as any address with $40^{th}$ bit set to 1. IANA has defined a reserved multicast MAC address as an address which is prefixed with 01-00-5E. With regard to multi-protocol labeled-switch transport profile (MPLS-TP) nodes, which may not be IP aware, IANA has recently defined a special Ethernet address: 01-00-5e-90-00-00.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

The subject technology is directed to a method and implementation for emulation of circuit switching in Ethernet by using an Ethernet circuit header (ECH) that is overlaid on a reserved multicast Ethernet media-access control (MAC) destination address. The subject technology may facilitate circuit switching at the Ethernet layer without requiring the traditional network layering hierarchy. In one or more aspects, an application can directly decide on which circuit to send an incoming packet without going through transport, network, and data link layers. Existing solutions may work above the Ethernet layer and may involve additional headers that can reduce an effective throughput of the network.

Figure 1:
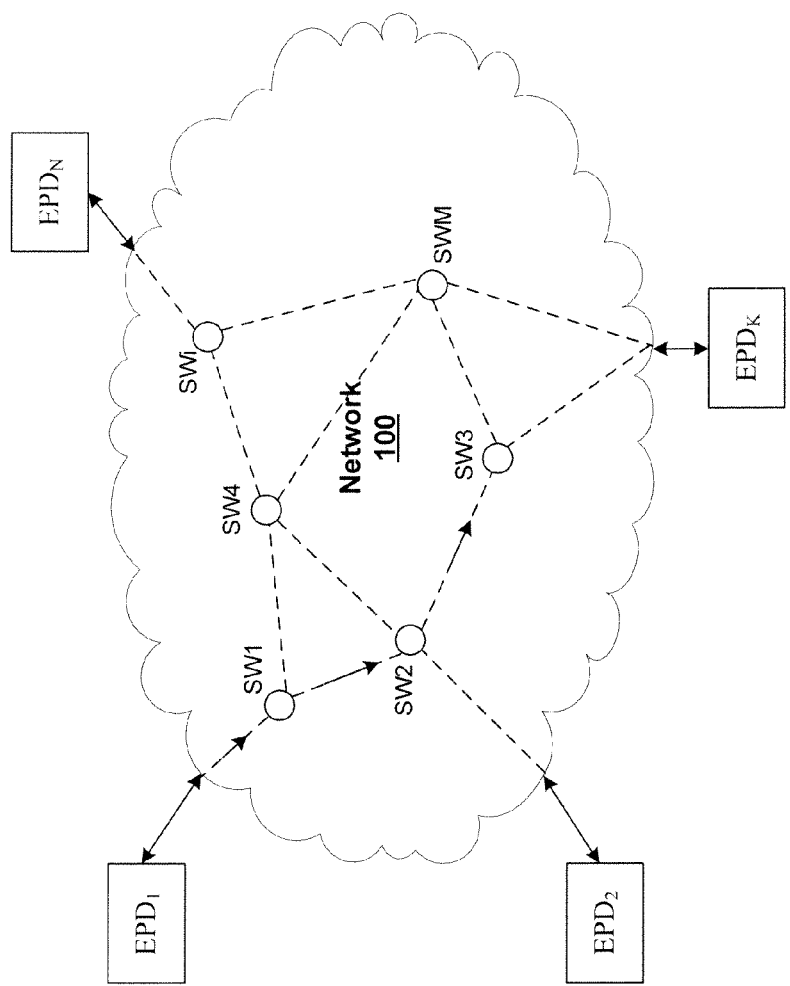
FIG. 1 illustrates an example of a network for implementing emulation of circuit switching using an Ethernet circuit header (ECH), in accordance with one or more implementations.

FIG. 1 illustrates an example of a network (e.g. Ethernet network) 100 for implementing emulation of circuit switching using an Ethernet circuit header (ECH), in accordance with one or more implementations of the subject technology. Examples of the network 100 may include a private network including a virtual local-area network (VLAN) such as a data-center network, an enterprise network, or other private networks. The network 100 includes a number of devices (e.g., nodes) such as multiple switches (e.g., $SW_1$, $SW_2$ ... $SW_M$) and a number of endpoint devices (e.g., $EPD_1$, $EPD_2$ ... $EPD_N$). An endpoint device may be a source (e.g., sending endpoint device) or a destination (e.g., receiving endpoint) of a data or control packet. Packets transmitted by an endpoint device may hop through a number of switches before reaching a destination endpoint device.

In one or more implementations of the subject technology, a node (e.g., a switch SW2) of the network 100 may receive a packet (e.g., a data packet or a control packet). The packet may be processed by one or more hardware modules and/or software modules stored in memory and processed by a processor. The processing of the packet may include processing of a data frame associated with the packet, which may include determining that the destination address portion of the data frame matches a predefined format. An ECH portion of the destination address may be parsed to identify a circuit identification (ID). The circuit ID may be looked up in a circuit ID table, using one or more key options, to generate a look-up-result data that can be used to direct the packet to a destination interface (e.g., port) of a destination node (e.g., switch).

In some aspects, a circuit may include a path through the network 100 that include a number of nodes. For example, a circuit between the switches SW1 and SW3 may include the switch SW2. The circuit can further be specific to particular ingress and egress ports of each switch in the path of the packet, as will be described in more detail below. Each circuit may be identified by a circuit ID. The subject technology may allow 16-bit circuit IDs that can result in $2^{16}$ endpoint addresses within a VLAN.

Figures 2A, 2B, 2C:
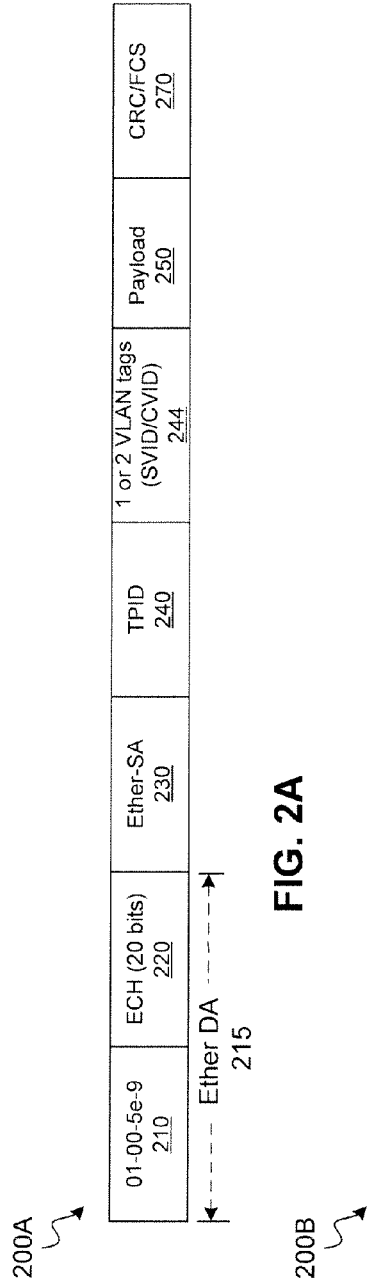
FIGS. 2A-2C illustrate examples of data frames, the ECH of which are used to implement emulation of circuit switching, in accordance with one or more implementations of the subject technology.

FIGS. 2A-2C illustrate examples of data frames 200A and 200C, the ECH 200B of which are used to implement emulation of circuit switching, in accordance with one or more implementations of the subject technology. The data frame (e.g., Ethernet data frame) 200A includes a destination address (DA) (e.g., Ethernet DA) section 215, a source address (SA) (e.g., Ethernet SA) section 230, a tag protocol identification (TPID) section 240, one or two VLAN tags (e.g., SVID/CVID) 244, a payload section 250, and cyclic-redundancy check (CRC)/frame-check sequence (FCS) 270. The DA section 215 may include a Ethernet address 210 and an ECH 220. The subject technology may use lower 20 bits of a special Ethernet address: 01-00-5e-90-00-00, defined specifically for multi-protocol labeled-switch transport profile (MPLS-TP) nodes, to perform circuit switching in MPLS and non-MPLS nodes. The ECH 220 may include 20 bits which can be grouped in three segments, as represented by 200B shown in FIG. 2B. The three segments may include an Ethernet circuit multicast segment 222 that includes a single bit, an Ethernet circuit ID 224 (e.g., 16 bits), and Ethernet circuit multicast priority 222 (e.g., three bits).

The single bit of the Ethernet circuit multicast segment 222 indicates the Ethernet circuit ID is a multicast (e.g., have more than one recipient) circuit ID or a unicast circuit ID (e.g., have one recipient) when it is set to one or zero, respectively. The Ethernet circuit ID 224 may represent a path (e.g., a circuit switched path) that can be used by an endpoint device (e.g., the $EPD_K$ of FIG. 1, such as a host) or intermediate switches (e.g., switches SW1-SW3 of FIG. 1). The Circuit ID is unidirectional by nature, therefore, to achieve bidirectional flow between two nodes, two circuit switched path with different circuit IDs are required. The Ethernet circuit multicast priority 226 may define a quality of service (QoS) priority associated with a given circuit ID.

In one or more implementations, an Ethernet circuit may be required to be set up between two switches such as SW1 and SW3 of FIG. 1 via the switch SW2 of FIG. 1. One or more associated Ethernet circuit ID may be distributed between the switches SW1, SW2, and SW3 during a priority protocol run, in which SW3 may distribute a circuit ID (e.g., C2) to SW2 and SW2 may distribute a circuit ID (e.g., C1) to SW1. A data packet traveling from SW1 to SW2 may use the circuit ID C1, and may have the data frame 200C as shown in FIG. 2C. The data frame 200C includes the Ethernet special DA (e.g., 01-00-5e-9<ECH>), with the ECH header including the circuit ID C1, the Ethernet SA 230, an 802.1q TPID 242, one or more VLAN tags 244, the payload 250, and CRC/FCS 270. The Ethernet SA 230 may include the MAC address of SW1. When SW2 receives the above data packet, it recognizes the Ether-DA as special DA with MAC address with prefix 01-00-5e-9<ECH>. The switch SW2 may then perform an ingress check to make sure that the packet has been received on a correct interface and is enabled for Ethernet circuit switching. The switch may parse the ECH to determine if the Ethernet Circuit ID is unicast or multicast. The switch may retrieve the circuit ID from the packet and use the circuit ID to lookup in a Circuit-ID table and using keys such as an incoming port, S-VID, C-VID, and an incoming circuit ID (e.g., C1) to determine an outgoing circuit ID and an outgoing port. Packet processing at SW2 is described with respect to FIG. 3 below.

Figure 3:
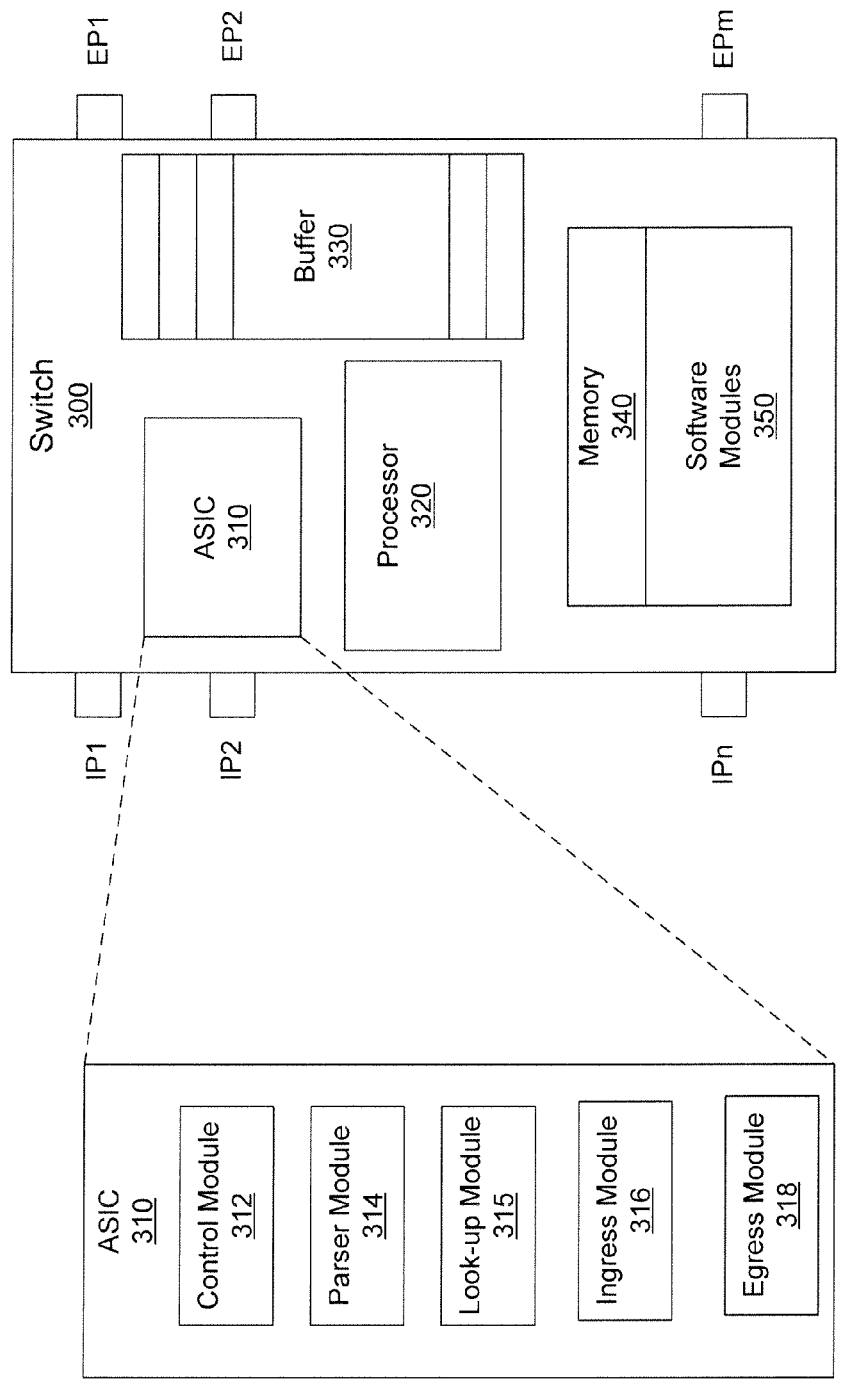
FIG. 3 illustrates an example of a switch configured to emulate circuit switching using an ECH, in accordance with one or more implementations.

FIG. 3 illustrates an example of a switch 300 configured to emulate circuit switching using an ECH, in accordance with one or more implementations of the subject technology. The switch 300 includes a number of ingress (input) ports IP1-IPn and multiple egress (output) ports EP1-EPm. The switch 300 may further include hardware components such as an application specific integrated circuit (ASIC) 310, which in some aspects may be implemented as a field-programmable logic array (FPGA), a processor 320, buffer 330, and memory 340. The ASIC 310 may include a number of modules such as a control module 312, a parser module 314, a look-up module 315, an ingress module 316, and an egress module 318. Examples of the processor 320 may include a general-purpose processor, a processor core, a multi-core processor, a controller, or other types of processor.

Returning to the above discussion with respect to FIG. 2C, in one or more implementations, the switch 300 can represent one of the switches SW1-SW3 of FIG. 1. For example, when the packet transmitted by SW1 is received at SW2, the control module 312 may be configured to determine that a destination address portion (e.g., 215 of FIG. 2A) of a data frame (e.g., 200A of FIG. 2A) associated with the packet matches a pre-defined format. The predefined format may include a pre-defined address with a lower 20 bits (e.g., 200B of FIG. 2B) that includes the ECH portion of the destination address. In other words, if the controller module 312 determines that the ECH portion of the destination address matches with the MAC address with prefix 01-00-5e-9<ECH>, then the packet is configured for Ethernet circuit switching. The parser module 314 may be configured to parse the ECH portion (e.g., ECH segment 230 of FIG. 2A) of the destination address to identify a circuit-identification (ID) (e.g., 224 of FIG. 2B such as C1 or C2). The parser module 314 may also parse the ECH portion to identify a multicast bit (e.g., 222 of FIG. 2B) and ECH priority bits (e.g., 226 of FIG. 2B).

The ingress module 316 may perform one or more ingress admission checks such as a unicast reverse-path check on incoming SA to make sure that the packet is received on a correct port (e.g., for VLAN) and the port is part of an incoming VLAN (e.g., network 100). The look-up module 315 may be configured to look up the circuit ID in a circuit-ID table using one of multiple key options, each including a number of parameters, to generate a look-up-result data. The multiple key options may include: a) an incoming port ID, an incoming source VLAN ID (S-VID), a customer-VID (C-VID), an incoming ECH circuit ID; b) an incoming port, an incoming S-VID, an incoming ECH circuit ID; c) an incoming S-VID, an incoming ECH circuit ID; or d) an incoming ECH circuit ID; e) an incoming port, incoming ECH circuit ID. The control module 312 may use the look-up-result data to direct the packet to a destination interface of a destination node. The look-up-result data may further provide the destination interface (e.g., one of IP1-IPn ports of the switch SW2) with an outgoing Circuit ID (e.g., C2) and an outgoing S-VID and/or C-VID depending upon the key option chosen. The egress module 218 may remark the ECH priority bits of the outgoing packet. If the circuit ID C2 is multicast, it can have multiple outgoing packets with different outgoing interfaces and outgoing circuit IDs. The data frame for the outgoing packet at SW2 may look similar to 200C of FIG. 2C, except for the circuit ID which is changed to C2.

The buffer 330 may include one or more queues of the outgoing packets. Each queue may correspond to an egress port (e.g., one of EP1-EPn). Examples of the memory 340 may include RAM, DRAM, SRAM, T-RAM, Z-RAM, TTRAM, or any other storage media. The memory 340 may include software modules 350 that when executed by a processor (e.g., processor 320) can perform some or all of the functionalities of the ASIC 310, specifically, the control module 312, the parser module 314, the look-up module 325, the ingress module 316, and the egress module 318, which may be included in the software module 350 or stored in another storage and executed by a processor.

Figure 4:
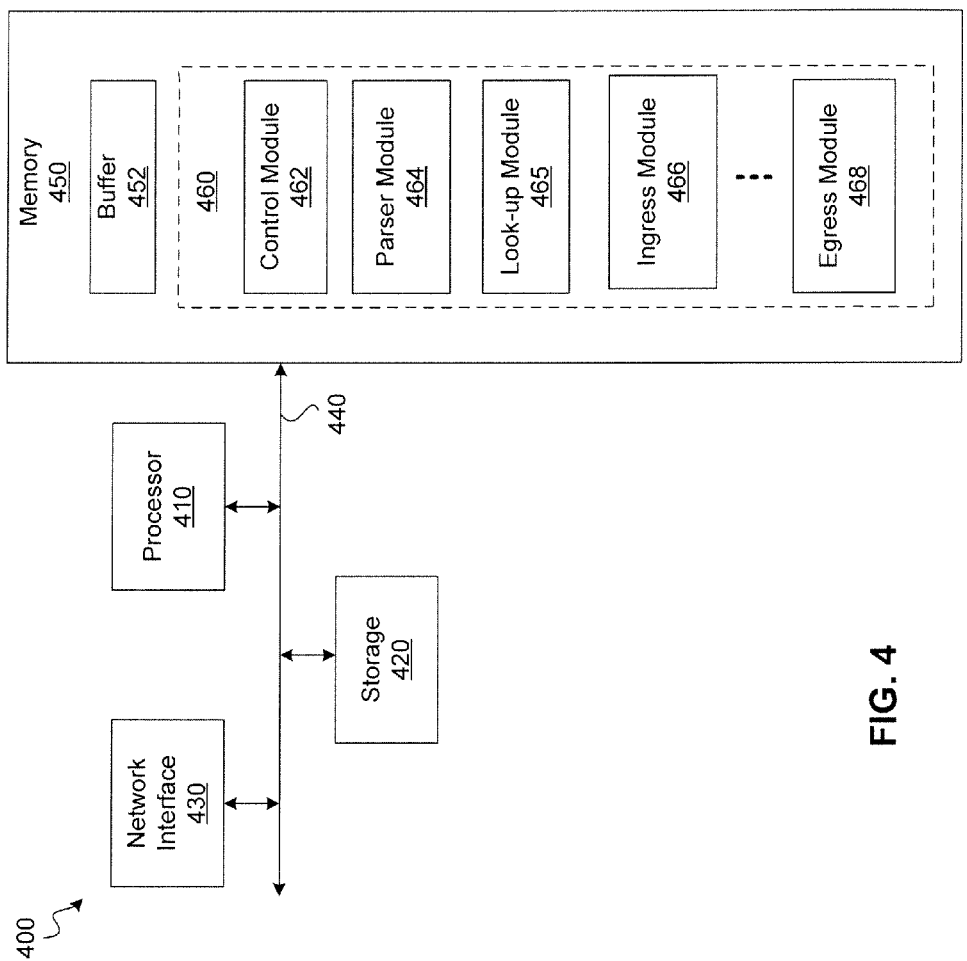
FIG. 4 illustrates an example of a system for emulation of circuit switching using an ECH, in accordance with one or more implementations.

FIG. 4 illustrates an example of a system 400 for emulation of circuit switching using an ECH, in accordance with one or more implementations of the subject technology. The system 400 may include a processor 410, a storage device 420, a network interface 430, and memory 450, coupled to one another via a bus 440. The processor 410 may include a number of hardware cores that can perform various functionalities, such as the functionalities of various modules of the ASIC 310 of FIG. 3. The network interface 430 may perform communications with other devices, such as switches (e.g., SW1-SWM of FIG. 1) or endpoint devices. The communications may include receiving and transmitting data and/or control packets. Examples of the memory 450 may include RAM, DRAM, static RAM (SRAM), flash memory, or other types of memory. Examples of the storage device 420 may include a DVR, a disk drive, flash memory, DRAM, or other types of memory.

The memory 450 may include a number of buffers such as a buffer 452, a number of program modules 460 that can be executed by the processor 410. The program modules 460 may include a control module 462, an parser module 464, a look-up module 465, an ingress module 466, and an egress module 468, which once executed by the processor 410 may perform the functionalities of the corresponding modules described above with respect to the ASIC 310 of FIG. 3.

Figure 5:
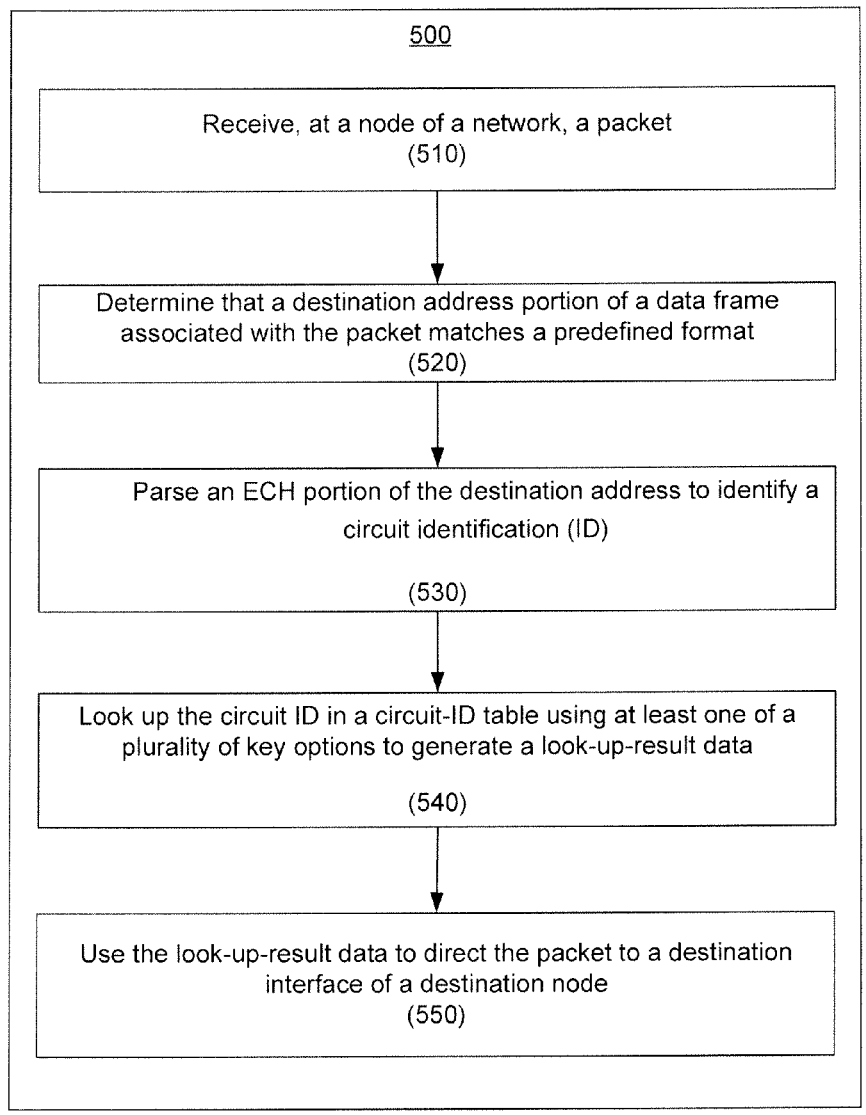
FIG. 5 illustrates an example of a method for emulation of circuit switching using an ECH, in accordance with one or more implementations.

FIG. 5 illustrates an example of a method 500 for emulation of circuit switching using an ECH, in accordance with one or more implementations of the subject technology. The steps of the method 500 do not need to be performed in the order shown and one or more steps may be omitted. A packet may be received at a node (e.g., SW1 of FIG. 1) of a network (e.g., 100 of FIG. 1) (510). It may be determined (e.g., by using 312 of FIG. 3) that a destination address portion (e.g., 215 of FIG. 2A) of a data frame (e.g., 200A of FIG. 2A) associated with the packet matches a predefined format (e.g., as in 260 of FIG. 2C) (520). An ECH portion of the destination address may be parsed (e.g., by using 314 of FIG. 3) to identify a circuit identification (ID) (e.g., 224 of FIG. 2B) (530). The circuit ID may be looked up (e.g., by using 315 of FIG. 3) in a circuit-ID table using at least one of multiple key options to generate a look-up-result data (540). The look-up-result data may be used (e.g., by 312 of FIG. 3) to direct the packet to a destination interface of a destination node (550).

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for emulating circuit switching, the method comprising:
   receiving, at a node of a network, an Ethernet packet;
   determining that a destination address portion of a data frame associated with the Ethernet packet matches a predefined format;
   parsing an Ethernet circuit header (ECH) portion of the destination address to identify a circuit identification (ID), wherein the ECH portion of the destination address further includes a multicast bit and ECH priority bits;
   looking up the circuit ID in a circuit-ID table using at least one of a plurality of key options to generate a look-up-result data; and
   using the look-up-result data to direct the packet to a destination interface of a destination node.

2. The method of claim 1, wherein receiving at the node of the network comprises receiving at a switch, and wherein the network comprises a local area network (LAN) including a virtual LAN (VLAN).

3. The method of claim 1, wherein the predefined format comprises a predefined address with a lower 20 bits that includes the ECH of the destination address portion, wherein the predefined address comprises an address reserved for multi-protocol labeled-switch transport profile (MPLS-TP) nodes.

4. The method of claim 1, further comprising performing one or more ingress admission checks to make sure that the Ethernet packet is received on a correct port and is enabled for Ethernet circuit switching.

5. The method of claim 4, wherein performing the one or more ingress admission checks comprises performing unicast reverse-path checks on an incoming source address to make sure that the Ethernet packet is received on a correct port corresponding to an associated VLAN of the network.

6. The method of claim 1, further comprising parsing the ECH portion to identify the multicast bit and the ECH priority bits and remarking the ECH priority bits of an outgoing Ethernet packet.

7. The method of claim 1, wherein the plurality of key options comprise a plurality of parameters, wherein the plurality of parameters comprises: an incoming port ID, an incoming source-VLAN ID (S-VID), an incoming costumer-VID (C-VID), and an incoming ECH circuit ID.

8. The method of claim 1, wherein using the look-up-result data comprises using a destination interface with at least one of an outgoing circuit ID, an outgoing S-VID or C-VID depending on the key options used in looking up the circuit ID in the circuit ID table.

9. The method of claim 1, wherein the circuit ID comprises a multicast circuit-ID, and wherein the multicast circuit ID supports multiple outgoing Ethernet packets with different outgoing interfaces and outgoing circuits.

10. A device for emulating circuit switching in Ethernet using an Ethernet circuit header (ECH), the device comprising:
    a node of a network configured to receive an Ethernet packet;
    a control module configured to determine that a destination address portion of a data frame associated with the Ethernet packet matches a predefined format;
    a parser module configured to parse an ECH portion of the destination address to identify a circuit-identification (ID), wherein the ECH portion of the destination address further includes a multicast bit and ECH priority bits;
    a look-up module configured to look up the circuit ID in a circuit-ID table using at least one of a plurality of key options to generate a look-up-result data; and
    the control module configured to use the look-up-result data to direct the Ethernet packet to a destination interface of a destination node.

11. The device of claim 10, wherein the node comprises a switch and the network comprises a local area network (LAN) including a virtual LAN (VLAN).

12. The device of claim 10, wherein the control module is configured to determine that a destination address portion of the data frame associated with the Ethernet packet matches a predefined address with a lower 20 bits that includes the ECH of the destination address portion, wherein the predefined address comprises an address reserved for multi-protocol labeled-switch transport profile (MPLS-TP) nodes.

13. The device of claim 10, further comprising an ingress module configured to perform one or more ingress admission checks and to make sure that the Ethernet packet is received on a correct port and is enabled for Ethernet circuit switching.

14. The device of claim 13, wherein the ingress module is configured to perform the one or more ingress admission checks by performing unicast reverse-path checks on an incoming source address and making sure that the Ethernet packet is received on a correct port corresponding to an associated VLAN of the network.

15. The device of claim 10, wherein the parser module is configured to parse the ECH portion to identify the multicast bit and the ECH priority bits, and wherein the device further comprises an egress module configured to remark the ECH priority bits of an outgoing Ethernet packet.

16. The device of claim 10, wherein the look-up module is further configured to look up the circuit ID in the circuit-ID table using at least one of a plurality of parameters, wherein the plurality of parameters comprises: an incoming port ID, an incoming source-VLAN ID (S-VID), an incoming costumer-VID (C-VID), and an incoming ECH circuit ID.

17. The device of claim 10, wherein the control module is further configured to use a destination interface with at least one of an outgoing circuit-ID, an outgoing S-VID or C-VID depending on the key options used in looking up the circuit ID in the circuit ID table.

18. The device of claim 10, wherein the circuit-ID comprises a multicast circuit-ID, and wherein the multicast circuit-ID supports multiple outgoing Ethernet packets with different outgoing interfaces and outgoing circuits.

19. A system for emulating circuit switching in Ethernet using an Ethernet circuit header (ECH), the system comprising:
  memory configured to store one or more program modules;
  one or more processors coupled to the memory and configured to execute the one or more program modules to perform:
    receiving, at a node of a network, an Ethernet packet;
    determining that a destination address portion of a data frame associated with the Ethernet packet matches a predefined format;
    parsing an ECH portion of the destination address to identify a circuit identification (ID), wherein the ECH portion of the destination address further includes a multicast bit and ECH priority bits;
    looking up the circuit ID in a circuit-ID table using at least one of a plurality of key options to generate a look-up-result data; and
    using the look-up-result data to direct the Ethernet packet to a destination interface of a destination node.

20. The system of claim 19, wherein the one or more processors are further configured to execute the one or more program modules to perform one or more ingress admission checks to make sure that the Ethernet packet is received on a correct port and is enabled for Ethernet circuit switching, and wherein performing the one or more ingress admission checks comprises performing unicast reverse-path checks on an incoming source address to make sure that the Ethernet packet is received on a correct port corresponding to an associated VLAN of the network.

* * * * *